(12) United States Patent
Mons et al.

(10) Patent No.: US 7,991,733 B2
(45) Date of Patent: Aug. 2, 2011

(54) DATA STRUCTURE, SYSTEM AND METHOD FOR KNOWLEDGE NAVIGATION AND DISCOVERY

(75) Inventors: Albert Mons, Rockville, MD (US);
Nickolas Barris, Chesterfield, MO (US);
Christine Chichester, Geneva (CH);
Barend Mons, Moerkapelle (CH); Erik van Mulligen, Rotterdam (NL); Marc Weeber, Groningen (NL)

(73) Assignee: Knewco, Inc., Rockville, MD (US)

( * ) Notice: Subject to any disclaimer, the term of this patent is extended or adjusted under 35 U.S.C. 154(b) by 458 days.

(21) Appl. No.: 12/078,473

(22) Filed: Mar. 31, 2008

(65) Prior Publication Data

US 2008/0301174 A1    Dec. 4, 2008

Related U.S. Application Data

(60) Provisional application No. 61/064,345, filed on Feb. 29, 2008, provisional application No. 61/064,211, filed on Feb. 21, 2008, provisional application No. 61/064,670, filed on Mar. 19, 2008, provisional application No. 61/064,780, filed on Mar. 26, 2008, provisional application No. 60/909,072, filed on Mar. 30, 2007.

(51) Int. Cl.
*G06F 17/30* (2006.01)

(52) U.S. Cl. ........ 707/603; 707/802; 707/794; 707/769; 707/999.102; 707/999.003; 715/760; 715/700; 715/205

(58) Field of Classification Search .................. 707/603, 707/794, 769, 802, 999.001, 999.003, 999.004, 707/999.005, 999.102; 715/760, 700, 205
See application file for complete search history.

(56) References Cited

U.S. PATENT DOCUMENTS

| | | | |
|---|---|---|---|
| 7,325,201 B2 * | 1/2008 | Ferrari et al. | 715/737 |
| 7,428,528 B1 * | 9/2008 | Ferrari et al. | 1/1 |
| 7,567,957 B2 * | 7/2009 | Ferrari et al. | 1/1 |
| 2008/0301174 A1 * | 12/2008 | Mons et al. | 707/102 |
| 2008/0306918 A1 * | 12/2008 | Mons et al. | 707/3 |
| 2009/0217179 A1 * | 8/2009 | Mons et al. | 715/760 |
| 2010/0174675 A1 * | 7/2010 | Mons et al. | 707/603 |
| 2010/0174739 A1 * | 7/2010 | Mons et al. | 707/769 |

* cited by examiner

*Primary Examiner* — Jean M Corrielus
(74) *Attorney, Agent, or Firm* — Rahman LLC (57) ABSTRACT

Data structures, systems, methods and computer program products that enable precise information retrieval and extraction, and thus facilitate relational and associative discovery are disclosed. The present invention utilizes a novel data structure termed a "Knowlet" which combines multiple attributes and values for relationships between concepts. While texts contain many re-iterations of factual statements, Knowlets record relationships between two concepts only once and the attributes and values of the relationships change based on multiple instances of factual statements, increasing co-occurrence or associations. The present invention's approach results in a minimal growth of the Knowlet space as compared to the text space and it thus useful where there is a vast data store, a relevant ontology/thesaurus, and a need for knowledge navigation and (relational, associative, and/or other) knowledge discovery.

23 Claims, 4 Drawing Sheets

DATA STRUCTURE, SYSTEM AND METHOD FOR KNOWLEDGE NAVIGATION AND DISCOVERY

CROSS-REFERENCE TO RELATED APPLICATIONS

This Application claims the benefit of, and is related to, the following of Applicants' co-pending applications:

U.S. Provisional Patent Application No. 61/064,345 titled "Enhanced System and Method for Knowledge Navigation and Discovery" filed on Feb. 29, 2008;

U.S. Provisional Patent Application No. 61/064,211 titled "System and Method for Knowledge Navigation and Discovery" filed on Feb. 21, 2008;

U.S. Provisional Patent Application No. 61/064,670 titled "Enhanced System and Method for Knowledge Navigation and Discovery" filed on Mar. 19, 2008;

U.S. Provisional Patent Application No. 61/064,780 titled "System and Method for Knowledge Navigation and Discovery Via Intellectual Networking" filed on Mar. 26, 2008;

U.S. Provisional Patent Application No. 61/064,670 titled "Enhanced System and Method for Knowledge Navigation and Discovery" filed on Mar. 19, 2008;

U.S. Provisional Patent Application No. 60/909,072 titled "Method and Object for Knowledge Discovery" filed on Mar. 30, 2007; and U.S. Non-Provisional patent application Ser. No. 12/078,474 titled "System and Method for Wikifying Content for Knowledge Navigation and Discovery" filed Mar. 31, 2008; each of which is incorporated by reference herein in its entirety.

COMPUTER PROGRAM LISTING APPENDIX

Features and advantages of the present invention will become more apparent when the detailed description set forth below is read in conjunction with the attached computer program listing Appendix 1 submitted herewith on a compact disc, the contents of which (file "Appendix1.txt", 25 KB, Mar. 28, 2008) is hereby incorporated by reference in its entirety. Such portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention generally relates to data structures, systems, methods and computer program products for navigating through large amounts of data, and more particularly to data structures, systems, methods and computer program products for navigating among the concepts found in such large amounts of data in order to facilitate the knowledge discovery process.

RELATED ART

In the current information era, information is being created at a phenomenal pace. For example, it has been estimated that the global, public Internet has over 500 billion pages of information spread out over 100 million Web sites and is growing every day. Such growth comes not only from Web site operators who "officially" post news stories, scientific research, Web logs (or "blogs") and the like, but also from members of the public at large. That is, the Internet's vast amount of pages of data also grows as a result of various "Wiki"-type sites, which are typically collaborative Web sites that users can easily modify, usually without much restriction. (A wiki allows anyone, using a Web browser, to edit, delete or modify content that has been placed on the site, including the work of other authors.)

As information is being created at a phenomenal pace, with the Internet serving as just one convenient example of a data repository, locating and analyzing the relevant pieces of certain information has never been a more important yet labor-intensive task, relevant to all aspects of human society. Due to the fact that large amounts of information have been encoded in natural language text, finding the "golden nuggets" of relevant information in large collections of text is often dubbed "text mining." Two main methodological approaches to text mining have developed over time—Information Retrieval (IR) and Information Extraction (IE).

Information Retrieval: Finding Documents

The problem of information retrieval is as old as the origin of libraries and archives. Once books or other media containing information have been stored, they have to be found. Catalogs and indexes are common tools for accessing large collections. In the computer age, where many texts have been digitized, computational tools have been developed to index and retrieve documents from large collections. Users of these tools typically use "keywords" or sentences to query the database, and the classical result is a list of publications deemed relevant to the query. For example, the query "Find papers that discuss new treatments for lung cancer" will likely return references to papers describing recent clinical trials testing drugs for lung cancer.

Research and development in using computers for IR dates back to the 1950's. Various algorithms and applications have been developed, and scientific researchers use IR tools on a daily basis, due to the fact that many bibliographic and other information sources are available online. For example, searching the Web using Google or Yahoo! is a typical IR task. From a methodological point of view, three different approaches to IR can be distinguished: Boolean, probabilistic, and vector space search.

One of the most widely-used biomedical bibliographic databases is PubMed, which uses a Boolean model. The query above, for example, would be transformed to something like "lung cancer AND treatment." While PubMed offers much refinement using keyword searching, it is still vulnerable to the typical disadvantages of Boolean searching: highly specific queries such as "papers AND discuss AND new treatments AND lung cancer" will typically yield results ranging from few to none. Furthermore, the results adhere to the word based and Boolean queries, and rank ordering the results based on relevance is typically not possible.

Both probabilistic and vector space searching offer a more sophisticated tool to deal with refined queries. For vector space retrieval, both the documents in a collection and the queries are represented by a vector of the most important words (i.e., keywords) in the text. For instance, the vector {papers, discuss, new treatments, lung cancer} represents the query above. Numeric values representing importance are assigned. After the documents and query have been transformed into a vector, angles between query and document vectors are typically computed. The smaller the angle between two vectors, the more similar these vectors are, or, in other words, the more similar or associated a document is to the query. The result of a vector space query is a list of documents that are similar in vector space. The first major improvement over Boolean systems is that the results can be rank-ordered. Thus, the first result is typically more relevant to the query than the last. The second major improvement is that even if not all words from the query are in any one document, in most cases the system will still return relevant results. Generally, the more refined and extensive a query is, the more refined the results are.

Information Extraction: Finding Facts

While an IR query results in a list of publications that are potentially relevant to a user's query, the user still has to read through the resulting papers to extract the relevant information. Returning to the sample query above, for example, a user may not be interested in simply seeing a list of papers describing new treatments for lung cancer, but might prefer an actual list of these new treatments. Thus, considerable effort has been put into the discipline of IE.

One of the central approaches to IE has been to predefine a template of a certain fact or fact combination. For example, a biochemical reaction involves not only different reactants, but often also a mediator molecule (i.e., a catalyst). Further, such reactions are often localized to specific cells, and even to specific parts of a cell. Extraction algorithms would first search for the part in the text that mentions one or more of the reactants then attempt to fill in the template by, for example, interpreting the name of a cell type as the location of the reaction. In many cases, advanced Natural Language Processing (NLP) techniques are needed as it is important not to interchange the subject and the object. Also, semantic analysis to extract the actual meaning is needed. The sentence "Lung cancer patients taking cisplatinum showed some improvement" does imply that the drug cisplatinum is used for treating lung cancer. The knowledge that cisplatinum is a drug, and that lung cancer is a disease, would greatly facilitate the computation of the relation "cisplatinum treats lung cancer." The computational efforts for this interpretation are much more demanding than for general IR, which explains why research and development in IE has only recently resulted in specialized systems that produce sufficiently accurate results.

Beyond Mining Discovery

While the explosion of digitally recorded information has daunting consequences for storage and retrieval, it also opens interesting avenues for knowledge discovery. Throughout human history, researchers have combined existing information with hunches to formulate hypotheses that are subsequently subject to testing. Human capacity to absorb information is limited, however, and computational tools to support hypothesis generation by processing large amounts of information comprise a promising tool in conducting research. Two main methodological approaches have been developed in this area, namely, relational discovery and associative discovery.

Relational Discovery

Pioneering research by Professor Don Swanson resulted in novel scientific hypotheses that have been corroborated by experiments. See Swanson, D. R. "undiscovered Public Knowledge," *Library Quarterly,* 1986; 56:103-118, the entirety of which is incorporated by reference herein. Swanson's assumption is that if a scientific paper mentions a relationship between A and B, and another paper indicates a relationship between B and C, then hypothetically, A and C are related without the necessity of a factual record of this relationship. As current science is highly specialized and compartmentalized, the paper that states the A-B relationship could be unknown and irretrievable by a researcher specialized in C. Swanson's first discovery, for example, was that Eskimos have a fish-rich diet, and the intake of fatty acids in fish oils (A) is known to lower blood platelet aggregation and blood viscosity (B). Eskimos have therefore a lower incidence of different heart-related diseases. In an unrelated medical discipline studying Raynaud's disease (C), it was found that patients with this disease suffer from increased blood viscosity and above normal blood platelet aggregation (B). See Swanson D. R., "Fish Oil, Raynaud's Syndrome, and Undiscovered Public Knowledge," *Perspectives in Biology and Medicine,* 1986; 30:7-18, the entirety of which is incorporated by reference herein. The transitive relationship that fish oil might improve the health of Raynaud's disease patients easily emerges, and was proven a few years after Swanson formulated the hypothesis by combining the information published in two unrelated scientific disciplines. In the past few years, different literature-based discovery tools have been developed that utilize the relational discovery principle. All of them to date, however, are in experimental stages, and not user-friendly.

Associative Discovery

Another approach to hypothesizing novel relationships from existing data is to employ standard IR tools. The key issue here is that a transformation is needed from a document world to an "object" world. An object can be anything that represents a concept or real-world entity. For example, documents describing a certain disease may be combined or clustered into a format that is typical for that disease. The vector space model, for example, can easily accommodate this transformation. The vectors of the documents describing the disease can be combined into one vector representing the disease. In this way, collections of documents may be transformed into collections of diseases, drug, genes, proteins, etc. Using this approach, discovery comprises finding objects associated with the query object in the vector space. For example, if the query object is "lung cancer," and the query is conducted on a collection of drug objects, the rank-ordered result of the query will contain not only drugs that have been mentioned together with lung cancer, but also drugs that have never been studied in this disease's context, which may be hypothetical new treatments for lung cancer. Similarly, a query using a vector representing Raynaud's disease in an object database storing chemicals and drugs will result in both existing treatments and potentially new treatments (such as fish oil). An important aspect of this "object" approach is that a search with any kind of object may be conducted, and any other kind of object may be requested.

Researchers' Needs

The most common motivation of research scientists—just one class of users of vast data stores such as the Internet—is to understand why things work the way they work. Researches develop various experiments to replicate certain conditions and find out why things happen. Executing the experiment is very often another main motivation of a researcher.

The life cycle of a scientific project starts with the birth of an idea, which may be a well-defined hypothesis or just a hunch, by one or more scientists. The idea often follows from previous experimental outcomes that are combined with reported knowledge and novel hypotheses. The challenge of today's data and knowledge deluge is to optimally combine the widely varying sources of information and knowledge to select only the most promising hypotheses.

Further, researchers continuously scan the scientific radar for emerging information. Current electronic tools that automatically increase the pile of papers to be read should be replaced by tools that digest most of the information and only emit warning signals when truly interesting knowledge has just been or is about to be discovered.

Given the foregoing problems of large data stores and the limitations of conventional text mining, what are needed are data structures, systems, methods and computer program products for knowledge navigation and discovery. Such data structures, systems, methods and computer program products should allow vast data stores to be semantically searched, navigated, compressed and stored in order to facilitate relational, associative and/or other types of knowledge discovery.

BRIEF DESCRIPTION OF THE INVENTION

Aspects of the present invention meet the above-identified needs by providing systems, data structures, methods and computer program products for facilitating knowledge navigation and discovery.

Based on concepts or units of thought rather than words, the data structures, systems, methods and computer program products for facilitating knowledge navigation and discovery are independent of choice of language and other concept representations. For a given field of study or endeavor, every concept in a thesaurus or ontology, or a collection thereof, is assigned a unique identifier. Two basic types of concepts are defined: (a) a source concept, corresponding to a query; and (b) a target concept, corresponding to a concept having some relationship with the source concept. Each concept, identified by its unique identifier, is assigned minimally three attributes: (1) factual; (2) co-occurrence; and (3) associative values. The source concept with all its associated (target) concepts that relate to the source concept with one or more of the attributes is stored in a novel data structure referred to as a "Knowlet™". (As will be appreciated by those skilled in the relevant art(s), a data structure is a way of storing data in a computer so that it can be used efficiently. Often a carefully chosen data structure will allow the most efficient algorithm to be used. A well-designed data structure allows a variety of critical operations to be performed, using as few resources, both in terms of execution time and memory space, as possible. Data structures are implemented using data types, references and operations on them provided by a programming language.)

The factual attribute, F, is an indication of whether the concept has been mentioned in authoritative databases (i.e., databases or other repositories of data that have been deemed authoritative by the scientific community in a given area of science and/or other area of human endeavor). The factual attribute is not, in and of itself, an indication of the veracity or falsehood of the source and target concepts relationship.

The co-occurrence attribute, C, is an indication of whether the source concept has been mentioned together with the target concept in a unit of text (e.g., in the same sentence, in the same paragraph, in the same abstract, etc.) within a database or other data store or repository that have not been deemed authoritative. Again, the co-occurrence attribute is not, in and of itself, an indication of the veracity or falsehood of the concepts relationship.

The associative attribute, A, is an indication of conceptual overlap between the two concepts.

The Knowlet, with its three F, C, and A attributes represents a "concept cloud." When an interrelation is created among the concept clouds of all identified concepts, a "concept space" is created. It should be noted that the Knowlets and their respective F, C, and A attributes are periodically updated (and may be changed), as databases and other repositories of data are populated with new information. The collection of Knowlets and their respective F, C, and A attributes are then stored in a knowledge database.

In one aspect of the present invention, the data structure, system, method and computer program product for knowledge navigation and discovery utilize an indexer to index a given source (e.g., textual) of knowledge using a thesaurus (also referred to as "highlighting on the fly"). A matching engine is then used to create the F, C, and A attributes for each Knowlet. A database stores the Knowlet space. The semantic associations between every pair of Knowlets/concepts are calculated based on the F, C, and A attributes for a given concept space. The Knowlet matrix and the semantic distances may be used for meta analysis of entire fields of knowledge, by showing possible associations between concepts that were previously unexplored.

An advantage of aspects of the present invention is that it can be provided as a research tool in the form of a Web-based or proprietary search engine, Internet browser plug-in, Wiki, or proxy server.

Another advantage of aspects of the present invention is that it allows users not only to make new (relational and associative) discoveries using concepts, but also allows such users to find experts related to a concept using authorship information located in the data store.

Another advantage of aspects of the present invention is that it uses a novel data structure called a "Knowlet" which allows scientists to make new (relational and associative) discoveries using concepts (and their automatically included synonyms) from a data store and a relevant (e.g., biomedical) ontology or thesaurus.

Another advantage of aspects of the present invention is that Knowlets enable precise information retrieval and extraction as well as relational and associative discovery and can be applied to any collection of content in any discipline at any level of scientific detail and explanation.

Yet another advantage of aspects of the present invention is that it allows more complex (and thorough) Internet search queries to be automatically built during concept browsing than can ever be crafted by humans.

Yet another advantage of aspects of the present invention is that it allows public data stores and authoritative ontologies or thesauri, to be augmented by private data stores and ontologies or thesauri thereby allowing for a more complete concept space and thus more knowledge navigation and discovery capabilities.

Yet another advantage of aspects of the present invention is that it allows users to more easily identify experts related to particular concepts for collaborative research purposes.

Further features and advantages of aspects of the present invention, as well as the structure and operation of these various aspects of the present invention, are described in detail below with reference to the accompanying drawings and computer listing appendix.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

Overview

Aspects of the present invention are directed to data structures, systems, methods and computer program products for facilitating knowledge navigation and discovery.

In one aspect of the present invention, an automated tool is provided to users, such as biomedical research scientists, to allow them to navigate, search and perform knowledge discovery within a vast data store, such as PubMed—one of the most-widely used biomedical bibliographic databases which is maintained and provided by the U.S. National Library of Medicine. PubMed includes over 17 million abstracts and citations of biomedical articles dating back to the 1950's. In such an aspect, the present invention does more than simply allow biomedical researchers to perform Boolean searches using keywords to find relevant articles. Using a novel data structure, interchangeably referred to herein as a "Knowlet," one aspect of the present invention allows scientists to make new relational, associative and/or other discoveries using concepts or units of thought (which would automatically include all synonyms of a concept expressed in a given language) from a data store and a relevant (e.g., biomedical) ontology or thesaurus, such as the United States National Library of Medicine's Unified Medical Language System® (UMLS) databases that contain information about biomedical and health related concepts.

Aspects of the present invention are now described in more detail herein in terms of the above exemplary biomedical researcher using the PubMed data store and a biomedical ontology. This description is provided for convenience only, and is not intended to limit the application of the present invention. After reading the description herein, it will be apparent to one skilled in the relevant art(s) how to implement the present invention in alternative aspects. For example, the present invention may be applied in any of the following areas, among others, where there is a vast data store, a relevant ontology/thesaurus, and a need for knowledge navigation and (relational, associative, and/or other) knowledge discovery:

- The intelligence community may benefit from the present invention, in one aspect, by mining vast amounts of intercepted e-mails and/or other information, in different languages, suggesting suspicious Knowlets and associations, and mining for seemingly unrelated facts in large bodies of documents, for example.
- The financial community may benefit from the present invention, in one aspect, by creating profiles of any document related to a financing deal structure, for example, including Knowlets of performance trends, management, and SEC filings, among others.
- The legal community may benefit from the present invention, in one aspect, by profiling all cases and related rulings, and by creating the opportunity to not only find related documents, experts and rulings, but also to mine for potential relationships between concepts in large amounts of documents pertaining to one particular case (e.g., document production), for example.
- The business community may benefit from the present invention, in one aspect, by mining a data store of owned patents and patent applications to find potential companies interested in licensing technologies similar to those disclosed therein, and by creating knowledge maps of companies involved in merger or acquisition activities, for example.
- The health care community may benefit from the present invention, in one aspect, by relating patient databases with the scientific literature would allow patients to create online "patient Knowlets" and be alerted to new information relevant to a particular disease or new medications that become available for that disease; these patient Knowlets may also serve as a basis for studies performed on patients with rare diseases, for example.

The terms "user," "end user", "researcher", "customer", "expert", "author", "scientist", "member of the public" and/or the plural form of these terms may be used interchangeably throughout herein to refer to those persons or entities capable of accessing, using, be affected by and/or benefiting from the tool that the present invention provides for knowledge navigation and discovery.

The System

Figure 1:
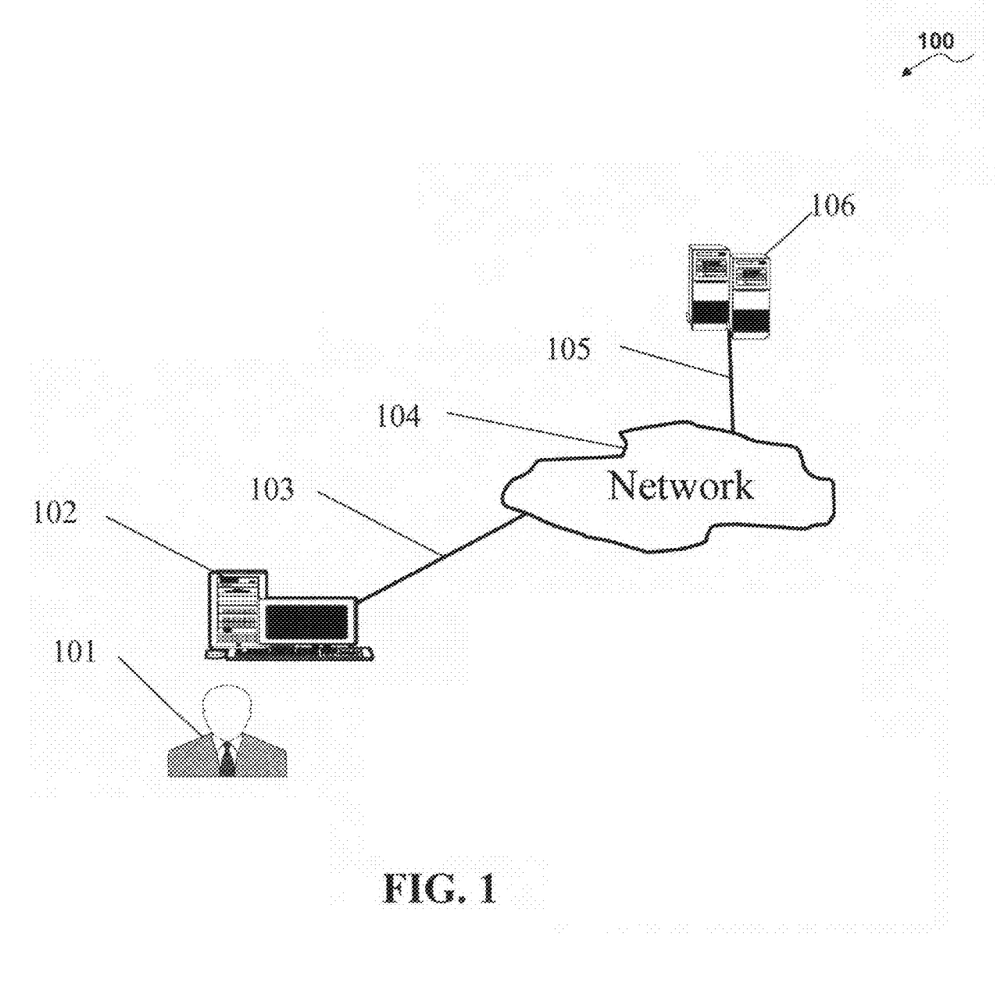
FIG. 1 is a system diagram of an exemplary environment, in which the present invention, in one aspect, may be implemented.

FIG. 1 presents an exemplary system diagram 100 of various hardware components and other features in accordance with an aspect of the present invention. As shown in FIG. 1, in an aspect of the present invention, data and other information hand services for use in the system is, for example, input by a user 101 via a terminal 102, such as a personal computer (PC), minicomputer, laptop, palmtop, mainframe computer, microcomputer, telephone device, mobile device, personal digital assistant (PDA), or other device having a processor and input and display capability. The terminal 102 is coupled to a server 106, such as a PC, minicomputer, mainframe computer, microcomputer, or other device having a processor and a repository for data or connection to a repository for maintaining data, via a network 104, such as the Internet, via communication couplings 103 and 105.

As will be appreciated by those skilled in the relevant art(s) after reading the description herein, in such an aspect, a service provider may allow access, on a free registration, paid subscriber and/or pay-per-use basis, to the knowledge navigation and discovery tool via a World-Wide Web (WWW site on the Internet 104. Thus, system 100 is scaleable such that multiple users, entities or organizations may subscribe and utilize it to allow their users 101 (i.e., their scientists, researchers, authors and/or the public at large who wish to perform research) to search, submit queries, review results, and generally manipulate the databases and tools associated with system 100.

As will also be appreciated by those skilled in the relevant art(s) after reading the description herein, alternate aspects of the present invention may include providing the tool for knowledge navigation and discovery as a stand-alone system (e.g., installed on one PC) or as an enterprise system wherein all the components of system 100 are connected and communicate via a secure, inter-corporate, wide area network (WAN) or local area network (LAN), rather than as a Web service as shown in FIG. 1.

As will be appreciated by those skilled in the relevant art(s), in an aspect, graphical user interface (GUI) screens may be generated by server 106 in response to input from user 101 over the Internet 104. That is, in such an aspect, server 106 is a typical Web server running a server application at a Web site which sends out Web pages in response to Hypertext Transfer Protocol (HTTP) or Hypertext Transfer Protocol Secured (HTTPS) requests from remote browsers being used by users 101. Thus, server 106 (while performing any of the steps of process 300 described below) is able to provide a GUI to users 101 of system 100 in the form of Web pages. These Web pages sent to the user's PC, laptop, mobile device, PDA or the like device 102, and would result in GUI screens being displayed.

The Knowlet

In aspects of the present invention, a novel data element or structure called a "Knowlet" is employed to enable lightweight storage, precise information retrieval and extraction as well as relational, associative and/or other discovery. That is, each concept in a relevant ontology or thesaurus (in any discipline at any level of scientific detail) may be represented by a Knowlet such that it is a semantic representation of the concept, resulting from a combination of factual information extraction, co-occurrence based connections and associations (e.g., vector-based) in a concept space. The factual (F), the textual co-occurrence (C), as well as the associative (A) attributes or values between the concept in question and all other concepts in the relevant ontology or thesaurus, and with respect to one or more relevant data stores, are stored in the Knowlet for each individual concept.

In an aspect, the Knowlet can take the form of a Zope (an open-source, object-oriented web application server written in the Python programming language distributed under the terms of the Zope Public License by the Zope Corp. of Fredericksburg, Va.) data element that stores all forms of relationships between a source concept and all its target concepts, including the values of the semantic associations to such target concepts).

Using such Knowlets, as will be described in more detail below, a "semantic distance" (or "semantic relationship") value may be calculated for presentment to a user. The semantic distance is the distance or proximity between two concepts in a defined concept space, which can differ based on which data store or repository of data (i.e., collection of documents) used to create the concept space, but also based on the matching control logic used to define the matching between the two concepts, and the relative weight given to factual (F), co-occurrence (C) and associative (A) attributes. The goal of such an approach is to replicate key elements of the human brain's associative reasoning functionality. Just as humans use an association matrix of concepts "they know about" to read and understand a text, aspects of the present invention seek to apply this power of vast and diverse elements of human thought to data stores or repositories of data. Given the above, aspects of the present invention are able to "overlay" concepts within a given text with factual, co-occurrence and associative attributes, for example. It will be recognized by those of ordinary skill in the art, however, that any number of attributes may be used, as long as these attribute(s) represent a relationship that may link a given concept with another concept.

Computer program listing Appendix 1 presents an XML representation of an exemplary Knowlet according to an aspect of the present invention. In such an aspect of the present invention, Knowlets can be exported into standard ontology and Web languages such as the Resource Description Framework (RDF) and the Web Ontology Language (OWL). Therefore, any application using such languages may be enabled to use the Knowlet output of the present invention for reasoning and querying with programs such as the SPARQL Protocol and RDF Query Language.

The Methodology

In one aspect of the present invention, a search tool is provided to user 101 for knowledge navigation and discovery. In such an exemplary aspect, an automated tool is provided to users, such as biomedical research scientists, to allow them to navigate, search and perform knowledge discovery within a vast data store, such as PubMed.

Figure 3:
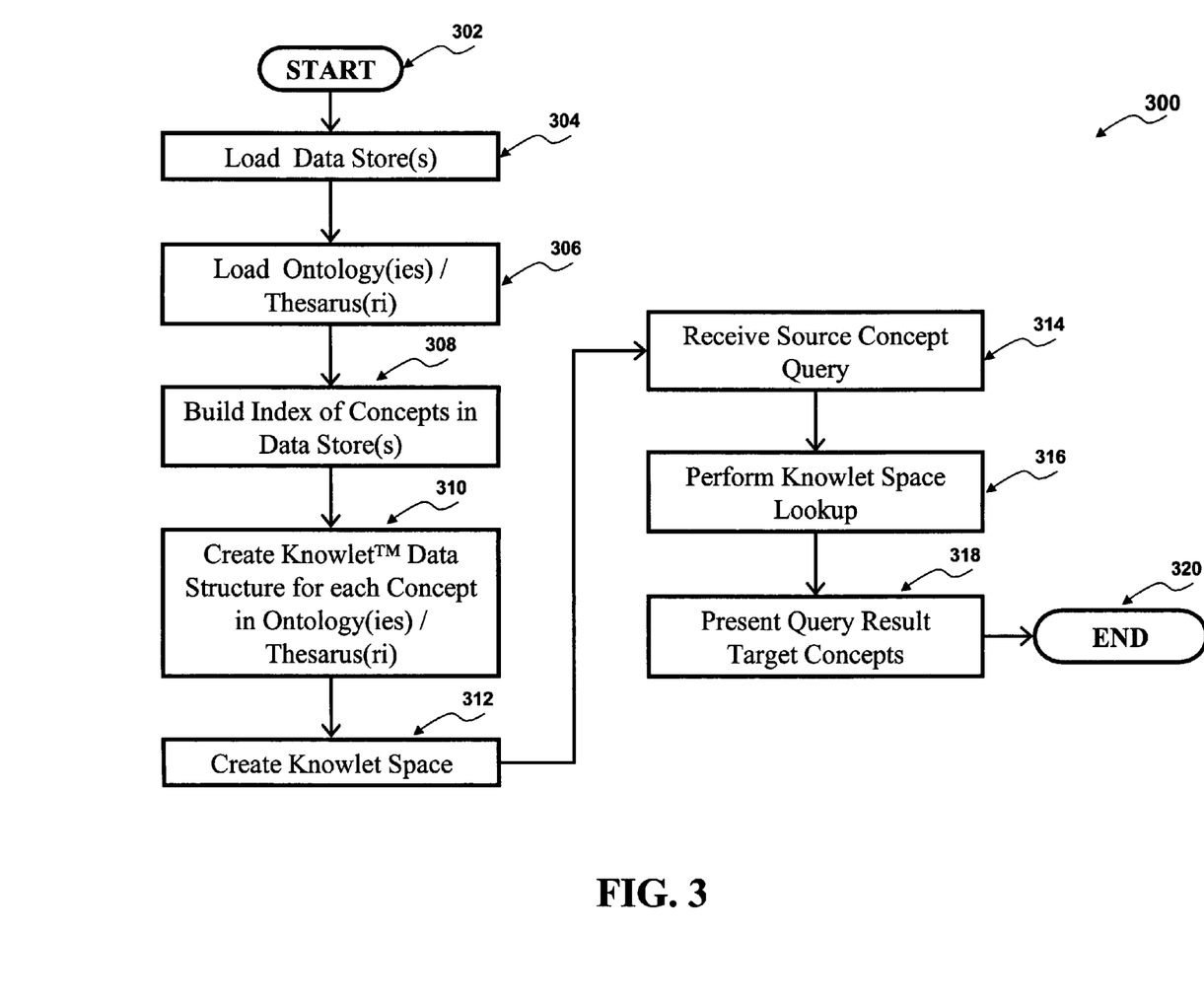
FIG. 3 is a flowchart depicting an exemplary Knowlet space creation and navigation process according to an aspect of the present invention.

Referring to FIG. 3, a flowchart depicting an exemplary Knowlet space creation and navigation process 300 of the automated tool according to an aspect of the present invention is shown. Process 300 begins at step 302 with control passing immediately to step 304.

In such an aspect of the present invention, step 304 connects system 100 to one or more data stores (e.g., PubMed) containing the knowledge base in which the user seeks to navigate, search and discover.

In such an aspect of the present invention, step 306 connects the system to one or more ontologies or thesauri relevant to the data store(s). Thus, where the data store is one of biomedical abstracts, for example, the ontology may be one or more of the following ontologies, among others: the UMLS (as of 2006, the UMLS contained well over 1,300,000 concepts); the UniProtKB/Swiss-Prot Protein Knowledgebase, an annotated protein sequence database established in 1986; the IntAct, a freely available, open source database system for protein interaction data derived from literature curation or direct user submissions; the Gene Ontology (GO) Database, an ontology of gene products described in terms of their associated biological processes, cellular components and molecular functions in a species-independent manner; and the like.

As will be appreciated by those skilled in the relevant art(s) after reading the description herein, aspects of the present invention are language-independent, and each concept may be given a unique numerical identifier and synonyms (whether in the same natural language, jargon or in different languages) of that concept would be given the same numerical identifier. This helps the user navigate, search and perform discovery activities in a non-language specific (or dependent) manner.

In such an aspect of the present invention, step 308 goes through each record of the data store (e.g., go through each abstract of the PubMed database), tags the concepts from the ontology (e.g., ULMS) that appear in each record, and builds an index recording the locations where each concept is found in each record (e.g., each abstract in PubMed). In one aspect, the index built in step 308 is accomplished by utilizing an indexer (sometimes referred to as a "tagger") which are known in the relevant art(s). In such an aspect, the indexer is a named entity recognition (NER) indexer (which utilizes the one or more ontologies or thesauri relevant to the data store(s) loaded in step 306) such as the Peregrine indexer developed by the Biosemantics Group, Medical Informatics Department, Erasmus University Medical Center, Rotterdam, The Netherlands; and described in Schuemie M., Jelier R., Kors J., "Peregrine: Lightweight Gene Name Normalization by Dictionary Lookup" Proceedings of Biocreative 2, which is hereby incorporated by reference in its entirety. Examples of other NER indexers include: the ClearForest Tagging Engine available from Rueters/ClearForest of Waltham, Mass.; the GENIA Tagger available from the Department of Information Science, Faculty of Science, University of Tokyo; the iHOP service available from http://www.ihop-net.org; IPA available from Ingenutity Systems of Redwood City, Calif.; Insight Discoverer™ Extractor available from Temis S. A. of Paris, France; and the like.

In one aspect of the present invention, step 310 creates a Knowlet for each concept in the ontology which "records" the relationship between that concept and all other concepts (as well as semantic distances/associations) within the concept space. In such an aspect, a search engine, such as the Lucene Search Engine, may be used to search the data store(s) for the occurrences of the concepts loaded into the system in step 306 and to determine the relationships between the concepts using the index created in step 308. The Lucene Search Engine, used in this example, is available under the Apache Software Foundation License and is a high-performance, full-featured text search engine library written in Java suitable for nearly any application that requires full-text (especially cross-platform) search.

In such an aspect of the present invention, step 312 creates and stores within the system (e.g., storing within a data store associated with server 106) a "Knowlet space" (or concept space), which is a collection of all the Knowlets created in step 310, thus forming a larger, dynamic ontology. Thus, if the ontology contains N concepts, the Knowlet space may be (at most) a [N]×[N−1]×[3] matrix detailing how each of N concepts relates to all other N−1 concepts in a Factual (F), Co-occurrence and (C) Associative (A) manner. In such an aspect of the present invention, step 312 includes the steps of calculating the F, C and A attributes (or values) for each concept pair. Thus, the Knowlet space is a virtual concept space based on all Knowlets, where each concept is the source concept for its own Knowlet and a target concept for all other Knowlets. (When the F, C or A values are non-zero within a Knowlet for a particular source/target concept combination, this is denoted herein as being in a F+, C+ or A+ state, respectively. And, when the values are less than or equal to zero, they are denoted as F−, C− or A−, respectively.)

As will be appreciated by those skilled in the relevant arts after reading the description herein, in the aspect of the present invention where the ontology is the UMLS, N may be well over 1,000,000 in magnitude.

As noted above, however, one aspect of the present invention contemplates the use of any number of attributes. Thus, in such an aspect, the Knowlet space may be represented as an [N]×[N−1]×[Z] matrix detailing how each of N concepts relates to all other N−1 concepts with respect to each of Z attributes. In such an aspect of the present invention, step 312 would include the steps of calculating Z number of attributes (or values) for each concept pair.

As will be appreciated by those skilled in the relevant arts after reading the description herein, in the aspect of the present invention, the Knowlet space may be made smaller (and thus optimized for computer memory storage and processing) than a [N]×[N−1]×[Z] matrix by reducing the [N−1] portion of the Knowlet. This is accomplished by a scheme where each concept is the source concept for its own Knowlet, and only those subset of N−1 target concepts where any of the Z attribute values (e.g., the F, C and A values) are positive are included as target concepts in the source concept's Knowlet.

In the aspect of the present invention where step 312 includes the steps of calculating the F, C and A attributes (or values) for each concept pair, the F value may be determined, for example, by factual relationships between two concepts as determined by analyzing the data store. In one aspect of the present invention, <noun> <verb> <noun> (or <concept> <relation> <concept>) triplets are examined to deduce factual relationships (e.g., "malaria", "transmitted" and "mosquitoes"). Thus the F value may be, for example, either zero (no factual relationship) or one (there is a factual relationship), depending on the search of the one or more data stores loaded in step 304.

Although the factual F value is zero or one, in one aspect of the present invention, it will be recognized by those of ordinary skill in the art that the factual attribute F may be influenced by taking into account one or more weighting factors, such as the semantic type(s) of the concepts, for example, as defined in the thesaurus. For example, a more meaningful relationship is presented by <gene> and <disease>, than by <gene> and <pencil>, which may in turn influence the F value. In this example, the F value is determined by the existence (or non-existence) of factual relationships in authoritative data sources accepted by the scientific community in a given area, such as PubMed. However, it will be apparent to those of ordinary skill in the art that the F value is not an indication of the veracity or authenticity of the concept or relationship, and that it may be determined based on other factors. Further, repetition of facts is of great value for the readability of individual text (e.g., articles) in the data store, but the fact itself is a single unit of information, and needs no repetition within the Knowlet space. There is an intuitive relationship between the level of repetition of facts in the "raw literature" of the data store and the likelihood that the fact is "true," but even multiple repetitions do not guarantee that a fact is really true. Thus, in an aspect of the present invention, it is assumed that beyond a predefined threshold, further repetition of a fact does not increase the likelihood that the factual statement is true.

The C value is determined by the co-occurrence relationship between two concepts, determined by whether they appear within the same textual grouping (e.g., per sentence, per paragraph, or per x number of words). In one aspect of the present invention, the C value may range from zero to 0.5 based on the number of times a co-concurrence of the two concepts is found within the data store(s). A co-occurrence may be determined by taking into account one or more weighting factors, such as the semantic type(s) of the concepts in the data store. The C value may therefore be influenced by, for example, one or more weights. That is, if a <drug> and a <disease> both occur in the same textual grouping under consideration (e.g., a sentence), there is in fact a co-occurrence. If <drug> and <city>, however, both occur in the same sentence, a co-occurrence relationship is less likely indicated by the present invention, in accordance with one aspect.

The A value is determined by the associative relationship between two concepts. In one example, the A value may range from zero to 0.4 depending on the outcome of a multidimensional scaling process in a cluster of concepts (i.e., n-dimensional space), which explores similarities or dissimilarities in the data store between the two concepts. The A value is an indication of conceptual overlap between two concepts. In one example, the closer the two concepts are in the multidimensional cluster of concepts, the higher the associative value A between them will be. If there is little or no conceptual overlap, the associative value A will be closer to zero.

The indirect association between two concepts is calculated based upon the matching of their individual "concept profiles." A concept profile is constructed as follows: For each concept found in the data store(s) loaded into system 100, a number of records are retrieved in which that specific concept has a significant incidence. In certain aspects, high precision may be favored at the expense of (IR) recall. A list is thus constructed such that concepts from minimally one, but up to a pre-defined threshold (e.g., 250), selected records within the data store (e.g., abstracts in PubMed) that are "about" that source concept. A ranked concept lists is then constructed by terminology-based, concept-indexing of the entire returned record (e.g., a PubMed abstract), followed by weighted aggregation into one list of concepts. The concepts in this list exhibit a high association with the source concept. These lists can now be expressed as vectors in multidimensional space and the associative score (A), for each of the vector pairs, is calculated. This associative score is recorded as a value between 0 and 1 in the A category of the Knowlet. Thus, even for those concepts between which the F and C parameters are negative, a positive association score A beyond a statistically defined threshold may indicate that there is significant conceptual overlap in their respective concept profiles to suggest an as yet non-explicit relationship. Thresholds can be calculated by comparing the distribution concept profile matches of non-related concepts of certain semantic types with those that are known to interact (e.g., all proteins that are not known to interact with those that are known to interact in Swiss-Prot and Intact).

In an aspect of the present invention, in the case where neither F nor C is positive for a given pair of concepts, there may still be circumstantial evidence for a meaningful relationship between the concepts, even if the association is only implicit. Such associative connections are captured in the Knowlet as the third parameter, A. In one aspect of the invention, the A parameter represents the most interesting aspect of the Knowlet (e.g., while using system 100 in a "discovery" mode as detailed below). As facts are moved from a C+ and F− state to an F+ state, the data store(s) loaded into system 100 become more factually solidified. However, bringing a concept combination from a F−, C− and A+ state to an F+ state will either yield new co-occurrences and facts missed so far or, more importantly, may in fact be part of the knowledge discovery process by in silico reasoning (and potentially, later laboratory-related experiments to confirm literature based hypotheses).

As will be appreciated by those skilled in the relevant art(s) after reading the description herein, steps 304-312 may be periodically repeated so as to capture updates to the data store(s) (e.g., new abstracts in PubMed) and/or ontology(ies) (i.e., new concepts).

In one aspect of the present invention, step 314 receives a search query from a user consisting of one or more source concepts (i.e., a selected concept taken as the starting point for knowledge navigation and discovery within the concept space).

In one aspect of the present invention, step 316 performs a lookup in the Knowlet space and calculates a semantic distance (SD) for all N−1 potential target concepts relative to the source concept, and produces a set of target concepts (i.e., concepts in the concept space that have a relation to the source concept). In one aspect, for example, the system would return a set of target concepts corresponding to the 50 highest SD values calculated within the Knowlet space.

In such an aspect, the semantic distance may be calculated:

$$SD = w_1 F + w_2 C + w_3 A;$$

where $w_1$, $w_2$ and $w_3$ are weights assigned to the F, C and A values, respectively. As will be appreciated by those skilled in the relevant art(s) after reading the description herein, users may be able to query the system in different modes which would then automatically adjust the $w_1$, $w_2$ and $w_3$ values. For example, in a "background" mode where the user simply wants factual, background information, $w_1$, $w_2$ and $w_3$ may be set to 1.0, 0.0 and 0.0, respectively. In another example, in a "discovery" mode where the user simply wants to highlight associative relationships, $w_1$, $w_2$ and $w_3$ may be set to 1.0, 0.5 and 2.0, respectively. In other aspects of the present invention, the F, C and A values may be weighted by different factors or characteristics (e.g., by semantic type) in different modes. Thus, the SD (or semantic association) is the computed semantic relationship between a source concept and a target concept based on weighted factual, co-occurrence and associative information.

In one aspect of the present invention, step 318 presents the target concepts to the user via GUI such that the user may view the source concept, the set of target concepts (color coded according to F, C, A and/or SD values) and the list of records within the data store(s) (i.e., the PubMed abstracts) which form the basis of the relationships for the SD calculations. Process 300 then terminates as indicated by step 320.

Figure 4:
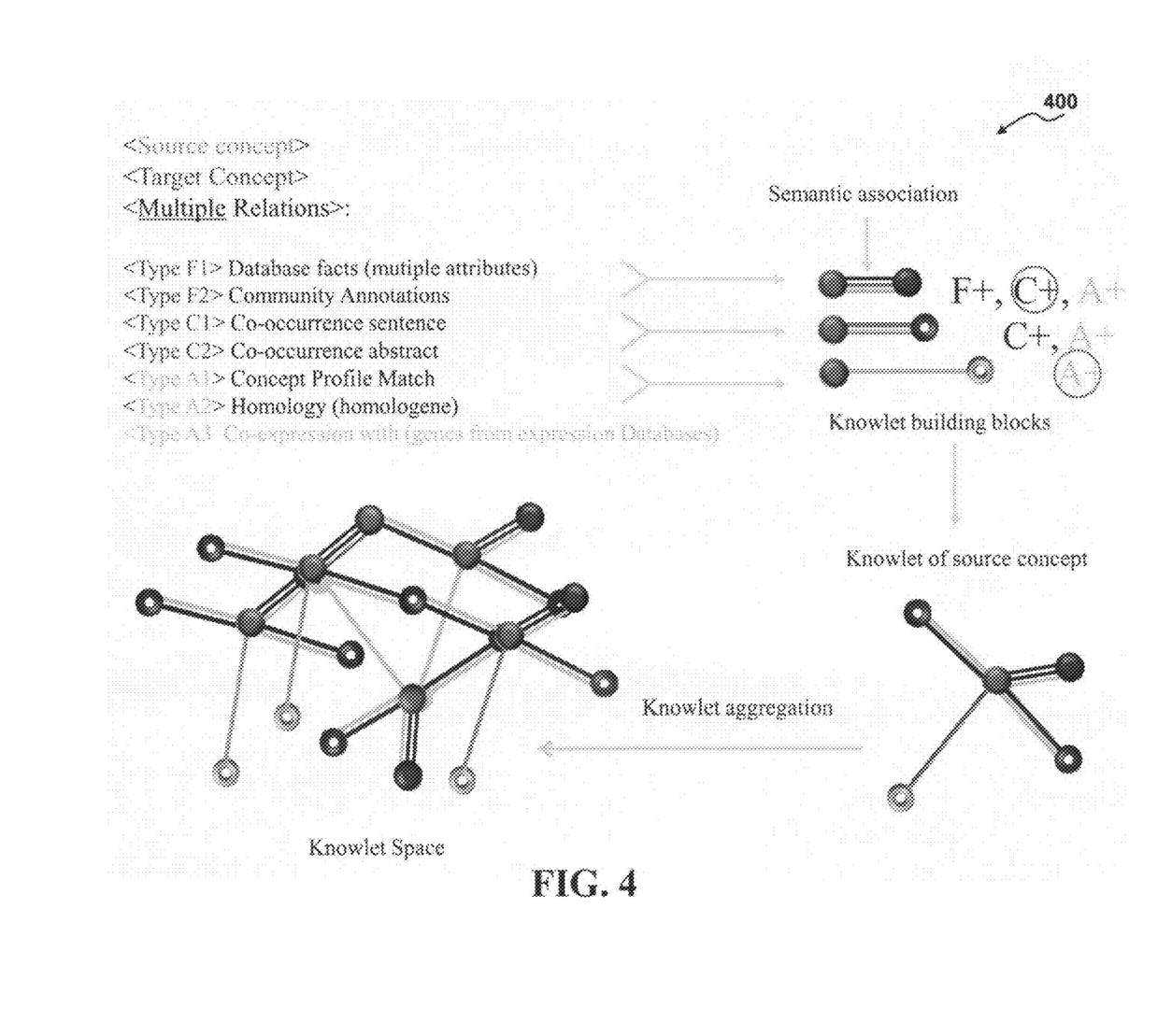
FIG. 4 is a block diagram depicting an exemplary composition of a Knowlet data structure according to an aspect of the present invention.

Referring to FIG. 4, a block diagram depicting an exemplary composition of a Knowlet data structure 400, as produced by process 300, according to an aspect of the present invention is shown.

In an aspect of the present invention where the an automated tool is provided to users, such as biomedical research scientists, to allow them to navigate, search and perform knowledge discovery, any concept in the biomedical literature, for instance a protein or a disease, can be treated as a source concept (depicted as a blue ball in FIG. 4). There may be curated information in authoritative databases such as UMLS or UniProtKB/Swiss-Prot concerning the concept and its factual relationships with other concepts. This information is captured and all concepts that have a "factual" relationship with the source concept in any of the participating databases are thus included in the Knowlet of that concept. These "factually associated concepts" are depicted in the Knowlet visualization as solid green balls in FIG. 4.

In addition, the source concept may be mentioned with other concepts in one and the same sentence in the literature. In that case, especially when there are multiple sentences in which the two concepts co-occur, there is a high chance for a meaningful, or even causal, relationship between the two concepts. Most concepts that have a factual relationship are likely to be mentioned in one or more sentences in the literature at large, but as process 300 may have only mined one data store (e.g., PubMed), there might be many factual associations that are not easy to recover from such data store alone. For instance, many protein-protein interactions described in UniProtKB/Swiss-Prot cannot be found as co-occurrences in PubMed. Target concepts which co-occur minimally once in the same sentence as the source concept, are depicted as green rings in the visualization of the Knowlet in FIG. 4.

The last category of concepts is formed by those that have no co-occurrence per unit of text (e.g., a sentence) in the indexed records of the data store, but have sufficient concepts in common with the source concepts in their own Knowlet to be of potential interest. These concepts are depicted as yellow rings in FIG. 4 and could represent implicit associations. Each source concept has a relationship of varying strength with other (target) concepts and each of these distances has been assigned with a value for Factual (F), Co-occurrence (C) and Associative (A) factors. The semantic association (or SD value) between each concept pair is computed based on these values.

In another aspect of the present invention, the user may enter two or more source concepts. In such an aspect, the system produces a set of target concepts which relate to all of the source concepts entered. As will be appreciated by those skilled in the relevant art(s) after reading the description herein, such an aspect may serve as a better IR or search engine. That is, source concepts A and B may have no factual (F) or co-occurrence (C) relationships in the one or more data store(s) loaded into the system in step 304. Thus, a traditional search engine may yield no results while performing a traditional Boolean/keyword search. Utilizing the Knowlet space, however, the present invention is able to produce target concepts which associatively (A) link the source concepts A and B.

In another aspect of the present invention, steps 308 and 310 described above can be augmented by also indexing the authors of the records in the data store (i.e., the authors of the publications whose abstracts appear in PubMed). In such an aspect of the present invention, not only are the N concepts mapped to each other in the Knowlet space, but also the universe of M authors are uniquely mapped to the N concepts such that the Knowlet space is now a $[N+M] \times [N+M-1] \times 3$ matrix (i.e., a concept space where each concept has a Knowlet and each author has a Knowlet). As will be appreciated by those skilled in the relevant art(s) after reading the description herein, such an aspect would allow users to easily identify experts related to particular concepts for collaborative research purposes.

As will be appreciated by those skilled in the relevant art(s) after reading the description herein, in aspects of the present invention where the universe of M authors are uniquely mapped to the N concepts such that the Knowlet space is a [N+M]×[N+M−1]×3 matrix (provided the number of Z attributes is three), many useful tools can be presented to users of system 100. In one such aspect, various contribution factors may be calculated for each of the M authors who appear in the data store(s) loaded into the system in step 304. The contribution factors would distinguish between those authors who were simply prolific (i.e., had a large number of publications) and those who were "innovative" (i.e., those authors whose works were responsible for two concepts co-occurring for the first time within the Knowlet space). As will be appreciated by those skilled in the relevant art(s) after reading the description herein, contribution factors may be calculated in a number of ways given the Knowlet space and the F, C and A parameters stored therein (e.g., the contribution factor may be based upon a per sentence, per article, or other basis). Contribution factors may also be calculated based on a sentence, sentences, an abstract or document, or a publication in general.

In another aspect of the present invention, as will be appreciated by those skilled in the relevant art(s) after reading the description herein, any images found within the data store(s) loaded into the system in step 304 (e.g., images found within articles in the data store) or images found in any other repository of images, may be associated with any of the N concepts during step 308. These images would then be indexed and referenced within the Knowlet space and utilized as another data point (or field) upon which the tool to navigate, search and perform discovery activities described herein may operate.

In another aspect of the present invention, as will be appreciated by those skilled in the relevant art(s) after reading the description herein, two separate Knowlet (or concept) spaces resulting from parallel set of steps 304-312 described above may be compared and searched to aid in the knowledge navigation and discovery process. That is, a Knowlet space created using a database and ontology from a first field of study may be compared to a second Knowlet space created using a database and ontology from a second (e.g., related) field of study. In one aspect, if a query in one ontology or resource fails to yield results, the present invention may provide an indication, based on the Knowlet space, that one or more relevant results may be found in the Knowlet space derived from another ontology or thesaurus.

In other aspects of the present invention, the tool to navigate, search and perform discovery activities may be provided in an enterprise fashion for use by an authorized set of users (e.g., research scientists within the R&D department of a for-profit entity, research scientists within a university, and the like). In such an aspect, the one or more (public) data stores loaded into the system can be augmented by one or more proprietary data stores (e.g., internal, unpublished R&D) and/or the one or more (public) ontologies or thesauri loaded into the system can be augmented by one or more proprietary ontologies or thesauri. In such an aspect, the combination of public and private data allows for a more complete (and, if desired, proprietary) concept space and thus more knowledge navigation and discovery capabilities. In such an aspect, the one or more private data stores loaded into the system may be unpublished articles by authors within the enterprise. This would allow users within the enterprise, for example, to capture and recognize, for example, new co-occurrences within the Knowlet space before the publication goes to print.

In other aspects of the present invention, the tool to navigate, search and perform discovery activities may offer users one or more security options. For example, in one aspect of the present invention, a Knowlet space created through the use of one or more proprietary data stores (e.g., internal, unpublished R&D) and/or one or more proprietary ontologies or thesauri may be stored within system 100 in an encrypted manner during step 312. In such an aspect of the present invention, as will be appreciated by those skilled in the relevant art(s), an encryption process may be applied to the Knowlet space such that only those with a decoding key (i.e., authorized users) may decrypt the Knowlet space.

Example Implementation

Aspects of the present invention, the methodologies described herein or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 2:
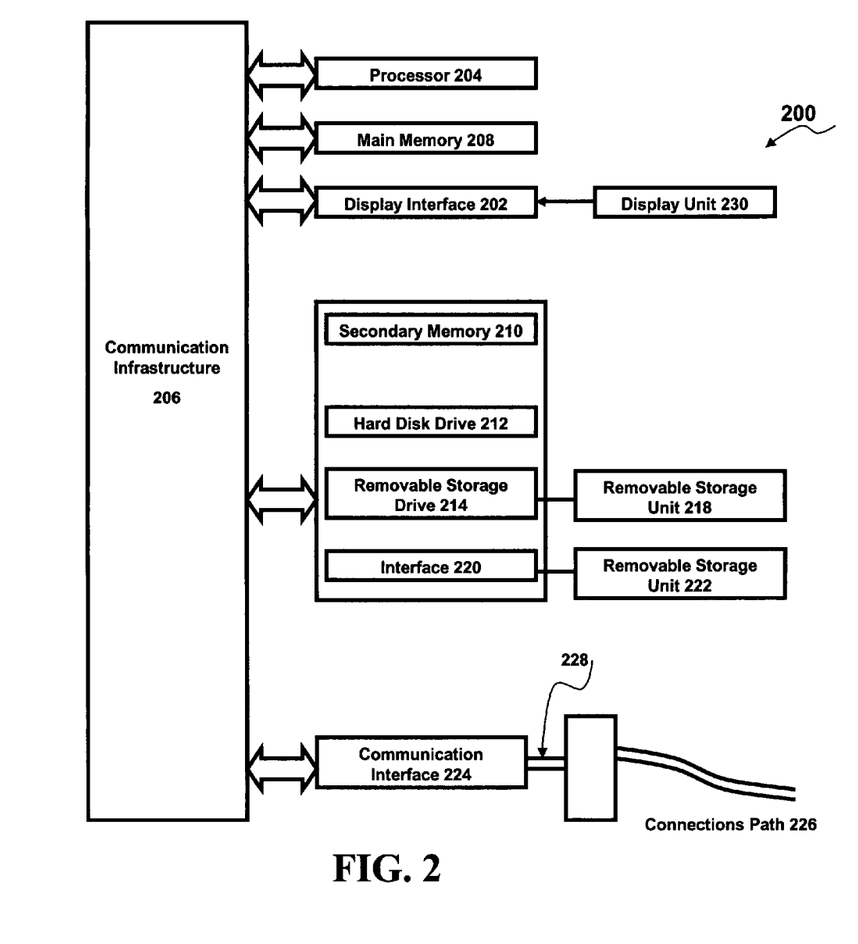
FIG. 2 is a block diagram of an exemplary computer system useful for implementing the present invention.

In fact, in one aspect, the invention is directed toward one or more computer systems capable of carrying out the functionality described herein. An example of a computer system 200 is shown in FIG. 2.

The computer system 200 includes one or more processors, such as processor 204. The processor 204 is connected to a communication infrastructure 206 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230.

Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218 represents a floppy disk, magnetic tape, optical disk, etc. which is read by and written to by removable storage drive 214. As will be appreciated, the removable storage unit 218 includes a computer usable storage medium having stored therein computer software and/or data.

In alternative aspects, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228 which may be electronic, electromagnetic, optical or other signals capable of being received by communications interface 224. These signals 228 are provided to communications interface 224 via a communications path (e.g., channel) 226. This channel 226 carries signals 228 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 214, a hard disk installed in hard disk drive 212, and signals 228. These computer program products provide software to computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an aspect where the invention is implemented using software, the software may be stored in a computer program product and loaded into computer system 200 using removable storage drive 214, hard drive 212 or communications interface 224. The control logic (software), when executed by the processor 204, causes the processor 204 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

In yet another aspect, the invention is implemented using a combination of both hardware and software.

CONCLUSION

While various aspects of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A method for creating a data structure for facilitating knowledge navigation and discovery, comprising:
    (a) loading at least one data store comprising a plurality of records related to a field of endeavor into a computer memory;
    (b) loading into said computer memory at least one thesauri, wherein said at least one thesauri contains an N number of concepts relevant to said field of endeavor, wherein said N is an integer;
    (c) assigning a unique identifier to each of said N concepts in said thesaurus;
    (d) creating an index of the locations where each of said N concepts is found within said plurality of records in said at least one data store;
    (e) searching said plurality of records within said at least one data store, using said index, to determine semantic relationships between each pair of N concepts;
    (f) calculating, using the results of said searching step (e), a Z number of semantic relationship values between each pair of N concepts, wherein said Z is an integer; (g) storing in said computer memory: (i) at least one of said unique identifiers corresponding to one of said N concepts; and (ii) said Z semantic relationship values corresponding to said one of said N concepts and the remaining N−1 concepts; and
    (h) establishing that said Z semantic relationship values are indicative of how said one of said N concepts relates to the remaining N−1 concepts in said at least one thesauri.

2. The method of claim 1, wherein each of said plurality of records are articles related to said field of endeavor.

3. The method of claim 1, wherein each of said plurality of records are article abstracts related to said field of endeavor.

4. The method of claim 1, wherein said field of endeavor is biomedicine, and said at least one data store is selected from the group consisting of: PubMed; UMLS; UniProtKB/Swiss-Prot; IntAct; and GO.

5. The method of claim 1, wherein N is greater than 1,000,000.

6. The method of claim 1, wherein Z is equal to three, and said semantic relationship values comprise:
    a factual semantic relationship value;
    a co-occurrence semantic relationship value; and
    an associative semantic relationship value.

7. The method of claim 6, further comprising:
    (i) calculating a semantic distance (SD) value between said one of said N concepts and one of the remaining N−1 concepts utilizing the formula:
    $$SD = w_1 F + w_2 C + w_3 A;$$

wherein: F represents said factual semantic relationship value; C represents said co-occurrence semantic relationship value; A represents said associative semantic relationship value; and $w_1$, $w_2$, $w_3$ are weights assigned to the F, C, and A semantic relationship values, respectively;

whereby said SD value is indicative of how strongly associated said one of N concepts is to said one of the remaining N−1 concepts.

8. The method of claim 7, further comprising:
(j) receiving a query from a user containing said one of said N concepts; and
(k) presenting to said user, via a graphical user interface, said SD value.

9. The method of claim 1, further comprising:
(i) performing step (g) for each of the N concepts in said at least one thesauri, thereby creating an N number of data elements; and
(j) storing, in said computer memory, said N data elements.

10. The method of claim 9, wherein said N data elements is stored in said computer memory as an [N]×[N−1]×[Z] matrix.

11. The method of claim 1, wherein said index created in step (d) is created at least in part by utilizing a named entity recognition (NER) indexer.

12. The method of claim 1, further comprising:
(i) loading, into said computer memory, at least one additional record in said at least one data store; and
(j) recalculating said Z number of semantic relationship values between each pair of N concepts.

13. A data structure, stored in a computer usable medium, created according to the steps of claim 1.

14. The data structure of claim 13, wherein said data structure is stored in a manner compliant with the Resource Description Framework (RDF).

15. The data structure of claim 13, wherein said data structure is stored as a Zope data element.

16. A computer program product comprising a computer usable medium having control logic stored therein for causing a computer to facilitate knowledge navigation and discovery, said control logic comprising:
first computer readable program code means for causing the computer to load at least one data store comprising a plurality of records related to a field of endeavor;
second computer readable program code means for causing the computer to load at least one thesauri, wherein said at least one thesauri contains an N number of concepts relevant to said field of endeavor, wherein said N is an integer;
third computer readable program code means for causing the computer to assign a unique identifier to each of said N concepts in said thesaurus;
fourth computer readable program code means for causing the computer to create an index of the locations where each of said N concepts is found within said plurality of records in said at least one data store;
fifth computer readable program code means for causing the computer to search said plurality of records within said at least one data store, using said index, to determine semantic relationships between each pair of N concepts;
sixth computer readable program code means for causing the computer to calculate, using the results of said fifth computer readable program code means, a Z number of semantic relationship values between each pair of N concepts, wherein said Z is an integer;
seventh computer readable program code means for causing the computer to store: (i) at least one of said unique identifiers corresponding to one of said N concepts; and (ii) said Z semantic relationship values corresponding to said one of said N concepts and the remaining N−1 concepts;
eighth computer readable program code means for establishing that said Z semantic relationship values are indicative of how said one of said N concepts relates to the remaining N−1 concepts in said at least one thesauri.

17. The computer program product of claim 16, wherein Z is equal to three, and said semantic relationship values comprise:
a factual semantic relationship value;
a co-occurrence semantic relationship value; and
an associative semantic relationship value.

18. The method of computer program product of claim 17, further comprising:
ninth computer readable program code means for causing the computer to calculate a semantic distance (SD) value between said one of said N concepts and one of the remaining N−1 concepts utilizing the formula:

$$SD = w_1 F + w_2 C + w_3 A;$$

wherein: F represents said factual semantic relationship value; C represents said co-occurrence semantic relationship value; A represents said associative semantic relationship value; and $w_1$, $w_2$, $w_3$ are weights assigned to the F, C, and A semantic relationship values, respectively;

whereby said SD value is indicative of how strongly associated said one of N concepts is to said one of the remaining N−1 concepts.

19. The computer program product of claim 18, further comprising:
tenth computer readable program code means for causing the computer to receive a query from a user containing said one of said N concepts; and
eleventh computer readable program code means for causing the computer to present to said user, via a graphical user interface, said SD value.

20. The computer program product of claim 16, further comprising:
ninth computer readable program code means for causing the computer to execute said seventh computer readable program code means for said N concepts in said at least one thesauri, thereby creating an N number of data elements; and
tenth computer readable program code means for causing the computer to store said N data elements.

21. The computer program product of claim 16, further comprising:
ninth computer readable program code means for causing the computer to load at least one additional record in said at least one data store; and
tenth computer readable program code means for causing the computer to recalculate said Z number of semantic relationship values between each pair of N concepts.

22. The computer program product of claim 16, wherein each of said plurality of records are article abstracts related to said field of endeavor.

23. The computer program product of claim 16, wherein said field of endeavor is biomedicine, and said at least one data store is selected from the group consisting of: PubMed; UMLS; UniProtKB/Swiss-Prot; IntAct; and GO.

* * * * *